United States Patent Office 3,298,235
Patented Jan. 17, 1967

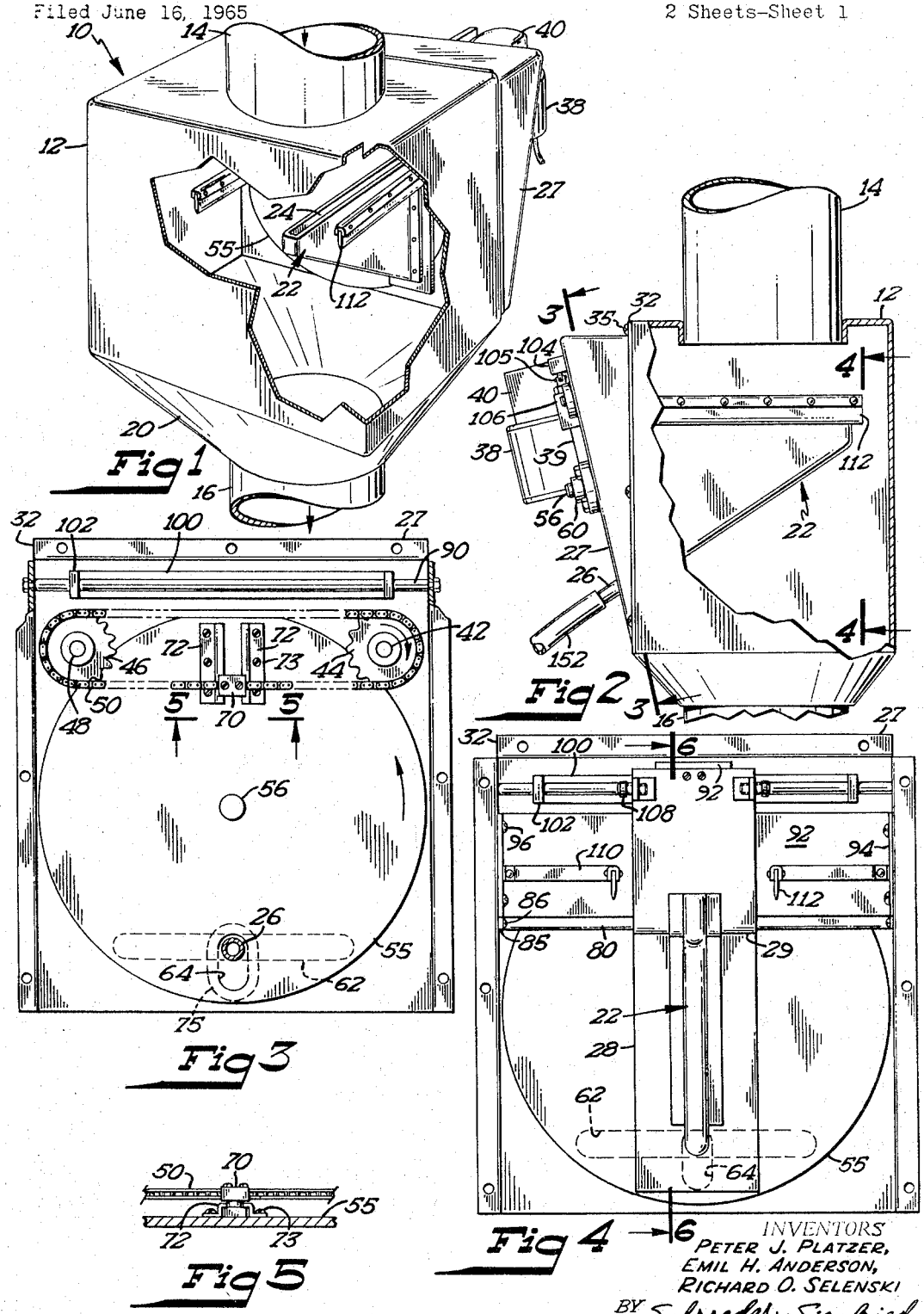

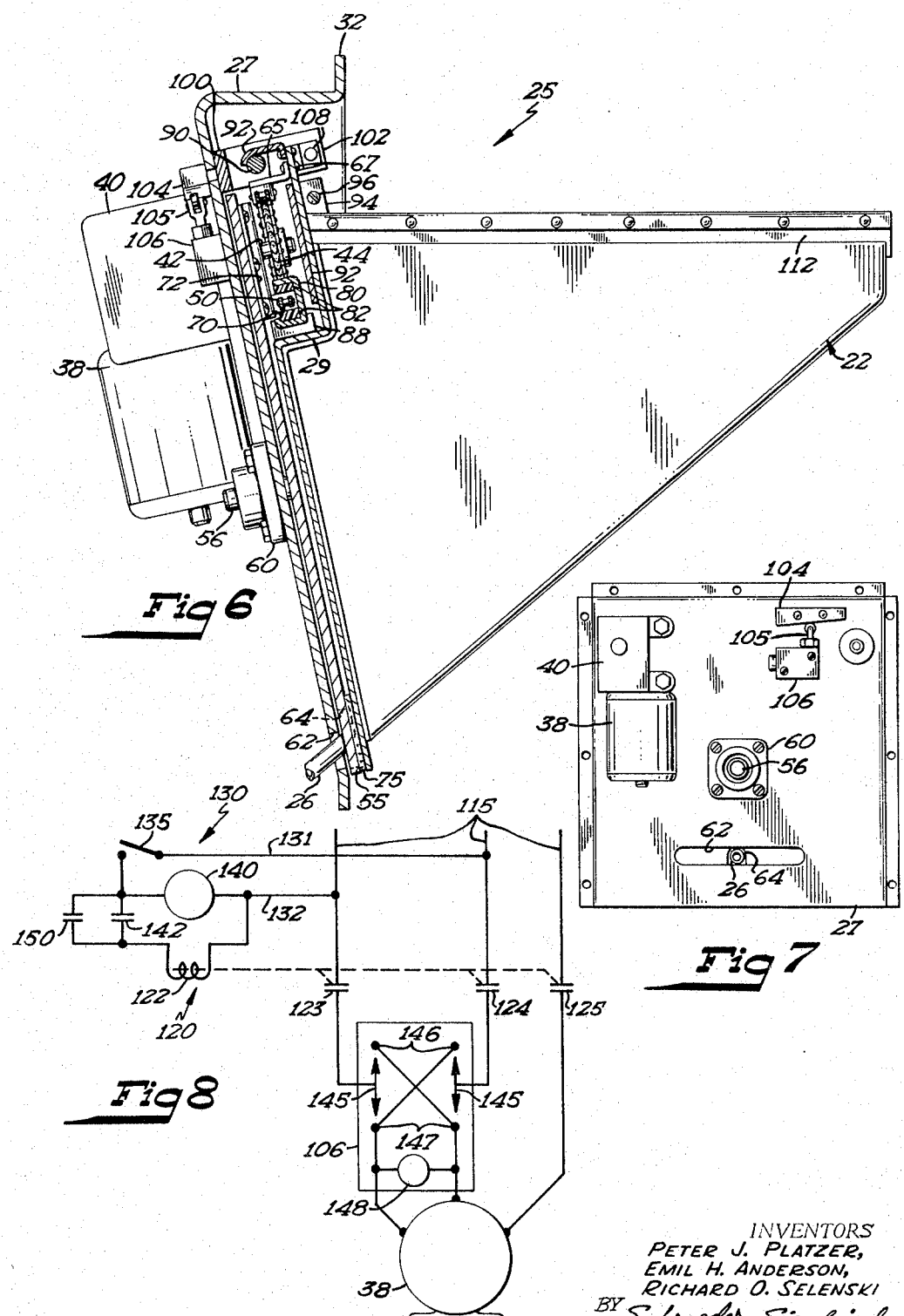

3,298,235
AUTOMATIC SAMPLING DEVICE
Peter J. Platzer, Minnetonka, and Emil H. Anderson and Richard O. Selenski, Richfield, Minn., assignors to Dean Garnet Manufacturing Company, Minneapolis, Minn., a corporation of Minnesota
Filed June 16, 1965, Ser. No. 464,304
14 Claims. (Cl. 73—422)

This invention relates to sampling devices and more particularly to an improved sampling device which is periodically moved through a stream of flowable material in a sampling device to cut the flow therethrough and take a representative sample of such material. This improved sampling device is particularly applicable to small grain and other fluent materials.

Samplers of this general type which take a fraction of a stream of material and are moved across the path of flow of a material are known and in use. They are sometimes called "cutter samplers." In an apparatus of this type, the mechanical structure for moving the sample chute or sample divertor through the stream of the material to be sampled has previously required physically large and complex sampling devices. As such, their applicability in certain locations is limited. Further the drive mechanism for the sample chute is normally exposed to the flow of material being sampled such as to provide clogging and excessive maintenance problems. In addition, accuracy in sampling requires that the sample taken be directed outside of the sampling device through a non-clogging type apparatus and with assurance that the sample chute and the storage device in which the sample is to be placed shall not be exposed to unsampled material such as to contaminate the sample. Problems of clogging, leakage of the sampling device and the necessity for physically removing the sample from within the sampling device have been the main disadvantages in prior sampling devices of this type.

The present invention provides a simplified sampling device which is compact and simple in design and in which accuracy in sampling is achieved. It utilizes a sample chute or divertor which is directed back and forth under the inlet conduit of the sampling device to provide a cutter type sample with the sample material being directed outside of the sampling device through a sealing mechanism which prevents contamination of the sample with the materials flowing in the sampling device. The improved sampling device is self-cleaning, is substantially trouble-free of maintenance problems, and provides for an automatic disposition of the sample such that the sampling device may be automatically and repeatedly used.

It is therefore the principal object of this invention to provide an improved sampling device particularly adapted for use with small grain.

Another object of this invention is to provide in a sampling device a positive sealed structure to prevent contamination of the sample taken and to provide accuracy in the sampling operation.

A further object of this invention is to provide in a sampling device of this type a sample chute which moves transversely across the inlet to the sampling device through an associated drive structure which is compact and physically small such that it may be utilized in substantially all locations.

A still further object of this invention is to provide an improved sampling device which insures isolation of the sample from the non-sampled material through an arrangement which is substantially clog free and sealed.

A still further object of this invention is to provide a sampling device in which the drive structure is removed from the flow of sampled material to reduce maintenance and contamination of the material sampled and to provide a minimum of obstruction in the path of flow of material through the sampling device.

Another object of this invention is to provide a sampling device which is easy to use, simple to maintain, low in cost and accurate in the sampling operation.

These and other objects of this invention will become apparent from the reading of the attached description together with the drawings wherein:

FIGURE 1 is a perspective view of the automatic sampling device with the parts broken away, FIGURE 2 is a side elevation view of the automatic sampling device with the parts broken away, FIGURE 3 is a sectional view of the automatic sampling device taken along the lines 3—3 of FIGURE 2, and FIGURE 4 is a sectional view of the automatic sampling device taken along the lines 4—4 in FIGURE 2, FIGURE 5 is a sectional view of the sampling device taken along the lines 5—5 in FIGURE 3, FIGURE 6 is an enlarged sectional view of the sample chute with the guide bracket and drive showing details of the same, FIGURE 7 is a back view of the improved sampling device with parts broken away, and FIGURE 8 is a schematic circuit diagram of the automatic sampling device.

Our improved sampling device is shown in perspective in FIGURE 1, generally at 10, as incorporating a casing 12 which is generally rectangular in cross section. The sampling device is adapted to be connected into a conveying line for granular material, such as small grain, where the conveying line is an enclosed conduit which may be generally tubular in construction. Further the improved sampling device is adapted to be mounted in any position in the conveying line or on a spout such that material to be sampled is transferred therethrough through the force of gravity or other flow generating means. Thus it will be seen in FIGURE 1, the casing has an inlet conduit or pipe 14 at the top thereof which is adapted to be connected into the conveying line and a tubular outlet conduit 16 at the opposite and bottom extremity of the casing which provides the outlet to the conveying line. The base of the casing is in the form of a generally truncated conical structure such as is indicated at 20, to insure the flow of granular material therethrough. Thus, under the influence of gravity, granular material may enter the inlet conduit or pipe 14 and be directed through the casing and along the sloped bottom wall of the truncated section 20 to the outlet conduit 16 so as not to impede the flow of granular material in the transmission or conduit line.

Within the casing 12 is a sample chute or sample diverter 22 which acts on the principle of the cutter sampler in that it is oscillated or moved translationally beneath the inlet conduit to the casing. Sample chute 22 is generally triangular in side elevation and has an inlet slot 24 extending across the upper side thereof which slot is generally narrow in width to permit only a fraction of the granular material falling on the same to enter the sampling chute. The sloped side or bottom wall of the triangular chute permits ready flow of the granular material to the apex of the form opposite the slot 24 at which is positioned a solid tubular conduit 26 to provide a free flow of the granular material therefrom. Thus, as the sample chute is moved translationally beneath the inlet conduit within the casing 12 it "cuts" or receives a fraction of the flow of granular material through the sampling device at any particular instant and takes such a sample across the entire width of the inlet conduit. The solid or sealed outlet pipe from the sample chute, as will be hereinafter identified, extends through the wall of the casing 12 such that the granular material picked up by the sample chute will be directed outside of the casing in a manner and through a structure which seals the sampling device to prevent leakage therefrom and which isolates the sampled material from the remaining flow through the sampling device so as not to contaminate the same with unsampled material. The structure for moving the sample chute 22 and for sealing the casing 12 at the outlet pipe while the chute is directed outside of the same is shown generally at 25.

This structure is mounted on a removable casing portion 27 which fits over an opening in one side of the casing 12 and attaches to the casing to be removable therefrom. Casing portion 27 is generally rectangular in form except that it is thicker at the top edge than at the bottom to give a generally triangular appearance from the side elevation. Sample chute 22 is mounted on this portion of the casing through a flat bracket member 28 which is wider than the width of the sample chute and has a bend along its extent, as at 29, for purposes to be later noted. The removable portion of the casing 27 has a flanged periphery 32 which attaches to the casing 12 through suitable screw means 35 with suitable sealing means therebetween, if desired. The removable portion mounts the drive and sealing structure for the sample chute such that the entire structure may be removed from the casing 12 as a single unit for maintenance purposes. The drive and sealing structure mounted on this portion will best be seen in the sectional views of FIGURES 2, 3, 4 and 6 to be hereinafter described.

As will be seen in FIGURE 2, the removable casing portion 27 mounts the motor 38 to a suitable mounting flange 39, the motor including a gear reduction section 40 which attaches to a journaled shaft 42 having a first sprocket or transmission element 44 mounted thereon. Shaft 42 is suitably journaled in the removable portion through means (not shown) and a similar sprocket 46 is also journaled on a shaft 48 mounted through a journaled structure positioned at the opposite edge of the removable casing portion 27. Extending over and around the sprockets 44, 46 is a chain 50 which provides a continuous propelling element to drive the sample chute as will be hereinafter defined. The sprocket 44 represents the drive member for the chain and the sprocket 46 the idler of the chain drive. Although we have shown chains, it will be recognized that this continuous propelling element may take other forms. Also mounted on the casing portion 27 is a circular disc member 55 which includes a shaft 56 mounted through a suitable journal 60 positioned at the exposed surface of the removable portion of the casing and centrally located thereon such as to centrally locate the disc 55 on the inner surface of the removable portion exposed to the interior of the casing 12. The removable portion 27 of the casing includes a generally elongated horizontal slot 62 which is adapted to cooperate with a radialy extending slot or aperture 64 in the disc to which the solid tubular outlet pipe 26 of the sample chute extends. In this manner, there will be no bends or flexing of the outlet pipe within the sample casing to impede the flow of the sample material from the sample chute to the sample collecting device (not shown). The sample chute, as it is oscillated back and forth beneath the inlet conduit, is driven by the chain drive as is also the circular disc 55 which moves such that the slot 64 therein aligns with the slot 62 in the removable portion 27 of the casing to provide an outlet passage for the pipe 26 of the sample chute while maintaining the sample chute in the substantially vertical position.

The sample chute 22 is connected to the chain drive at the upper strand thereof by means of a connecting bracket 65 which attaches to the offset portion of the bracket 28 beyond the bend 29 as indicated at 67. The removable clip 65 or bracket fits around and is connected to the upper strand of the chain 50 of the continuous propelling element such that the bracket 28 with the sample chute 22 thereon will move between the sprockets 44, 46. The offset portion of the bracket permits clearance of the chain drive and proximity of the remaining portion of the bracket adjacent the disc 55 which is rotated on its journaled shaft 56. The lower strand of the chain 50 mounts a nylon clip or journal member 70 which is slidably mounted between a pair of channel members 72 forming a channel guide on the disc to which the channel members 72 are suitably attached through means such as screws 73. Thus as the lower strand of the chain 50 is moved, the nylon clip attached attached thereto slides in the channel guides 72 to rotate the disc 55 about its journaled shaft. It will be noted that as the drive sprocket is rotated in any particular direction, that the upper strand will move translationally in a direction opposite to the lower strand. Thus, for example, should the drive sprocket 44 be moved in a clockwise direction as viewed in the sectional view of FIGURE 3, the upper strand will move from left to right as viewed in the sectional view and the lower strand from right to left causing a counterclockwise rotation of the disc 55. Such a counter-clockwise rotation will impart a movement of the slot 64 in a manner from left to right to align vertically with the sample chute as it is connected to the bracket 65 such that the slot 64, 62 will remain in alignment and be vertically disposed beneath the connection of the bracket 28 to the upper strand of the chain to maintain the sample chute in a vertical position and to provide outlet passage for the tubular conduit 26 therefrom outside of the casing 12. The position of the channel guides 72 are aligned diametrically opposite the aperture or slot 64 in the rotating disc and the general extent of the horizontal slot 62 in the removable portion 27 of the casing is equal to the translational length of travel of the sample chute beneath the inlet conduit 14. The radially extending slot 64 is of such length that in the centrally located position of the sample chute within the casing 12, the upper edge of the slot 64 aligns with the upper edge of the slot 62 in the casing and the combined slots provide a clearance sufficient only to accommodate the diametrical dimension of the outlet pipe. As the disc is rotated to its extremes of oscillating travel defining the ends of the horizontal travel of the sample chute, the lower edge of the radial slot 64 will align with the lower edge of the translationally extending slot 62 in the casing to again define a minimum passage for the tabular conduit. Suitable felt means 75 may be positioned around the radially extending slot on the inner surface of the disc 55 and adjacent the translationally extending slot 62 in the casing to aid in the sealing of the disc to the removable portion 27 of the casing, if desired.

In the drive of the rotating disc or oscillating disc 55, the connecting block 70 for the lower strand of the chain is further guided in a channel member 80 which is generally U-shaped in form and has side surfaces 82 of a suitable journal material which requires no lubricant such as nylon positioned therein to slidably mount the connecting block 70 therein which may also be formed from a similar material. The extremities of the channel member 80 are suitably connected to the side walls of the removable portion, as at 85 through suitable means such as screws 86. In this manner, the block 70 will be guided translationally or horizontally to insure that the travel of the lower strand of the chain 50 will follow such a path. As the chain moves translationally back and forth in a horizontal plane, the block 70 will be guided in the channel members 72 to impart oscillating or rotative movement to the disc 55. Positioned at the bend 29 of the bracket 28 which defines the offset portion of the bracket is an additional nylon guide 88 which rides on the guide channel 80 of the lower chain strand such that the bracket 28 will be moved and guided in a vertical position with the sample chute 22 thereon. In addition, a guide shaft 90 is positioned across the upper edge of the removable portion and suitably mounted in the end or side walls thereof through means (not shown). A portion of the bracket 65 rests on the guide shaft 90 such as at 91, such that the bracket 28 is guided by means of the shaft 90 and the guide bracket 88 on the guide channel 80 as the bracket 28 is moved by the upper strand of the chain through the connection of the bracket 65 thereto. The lower extremity of the bracket 28 has no further connection or guide with respect to the disc 55. Also positioned over the sprockets 44, 46 and the chain is a flat enclosing plate 92 which has flanges 94 at the extremity thereof to facilitate connection with the side walls of the removable portion 27 of the casing through suitable means such as screws 96.

Shaft 90 in addition mounts a yoke member 100 having bifurcated extremities 102 which fit around the shaft 90 and slidably mount thereon. The bifurcated bracket 100 is positioned adjacent a slot in the removable portion 27 of the casing through which a cam block 104 (see FIGURE 7) is mounted and suitably connected to the back of the bifurcated bracket. The cam block 104 is adapted to engage the operating arm or roller 105 of the reversing switch 106 to effect reversal of the motor as the sample chute 22 reaches the extremes of its travel. The bifurcated portions 102 of the bracket 100 are adapted to be engaged by pins 108 mounted in the offset portion of the chute mounting bracket 28 such that the bracket 100 will be slidably movable on the shaft 90 as the chute approaches its extremes of travel. Such movement of the bracket 100 will move the cam block 104 to operate the switch 105 for a conventional reversing or switching operation. The extremes of travel of the bracket 28 are determined by the engagement of the stops 108 thereon as they engage the bifurcated extremities 102 of the U-shaped bracket 100 mounted on rod 90 to operate the reversing switch and reverse the direction of travel to the motor 38, as will be hereinafter defined.

At these extremes of travel, the upper edge of the sample chute 22 are positioned adjacent and beneath a pair of transversely extending flanges 110 which are mounted on the plate 92 covering the sprockets 44, 46 and chain 50. These brackets have extending portions which extend into the casing a distance slightly greater than the length of the sample chute 22 into the casing and the flanges mount sealing members 112 thereon shown herein as rubber stamps which seal members are adapted to engage the upper surface of the sample chute and cover the opening 24 therein to seal the sample chute at the extreme of travel positions. The sealing member may vary in shape and material, if desired. In this manner, no blow-back or extraneous material will be allowed to enter the sample chute except when the the sample chute is transversing the area under the inlet conduit 14 within the casing 12.

Motor 38 which drives the sample chute 22 in an oscillating manner and in a horizontal direction through rotation of the drive sprocket 44 and movement of the drive chain 50 is controllably energized through a control circuit, such as is indicated schematically in FIGURE 8. Thus as is indicated in FIGURE 8, 115 indicates a plurality of conductors for presenting a polyphase energizing source. A single phase source with suitable switching may also be employed. In this control circuit, the reversing switch 106 will operate to reverse a pair of energizing conductors connected to the drive motor 38 to reverse the direction of rotation of the motor. The schematic diagram in FIGURE 8 shows a power contactor 120 having an energizing coil 122 and contacts 123, 124 and 125 positioned in the supply conductors leading to the motor. Depending upon the current rating of the motor, the starting contactor may be omitted and the starting and reversing completed through the reversing switch 106 only, if desired. In the schematic diagram, 130 indicates generally a control portion of the circuit having input conductors 131, 132 connected to a pair of the supply conductors with an initiating switch 135 positioned in one of the conductors. Where automatic operation or timed operation of the sampling device is desired, a suitable timing mechanism 140 having an associated switch contact 142 is included in the control circuit, the timer being connected across the control circuit conductors to be energized with the closure of the starting switch 135. Its associated timing contact is connected in series in the control circuit with the coil 122 of the contactor 120 to open and close the contacts 123–125 thereof. In this manner the motor is isolated from the supply conductors except during the periods when the timer requires energization of the motor. The reversing switch includes double throw-double pole contacts connected in a conventional reverse switching arrangement in which two of the power conductors 115 representing alternate phases of the polyphase energizing source will be connected to the movable elements 145 of the reversing switch 106 with the stationary contacts 146, 147 being connected in a reversing connection to reverse the input phase leads to the motor 38 whenever the switch 106 is actuated between opposite control positions. Thus the motor will run to one extreme of travel and reverse the connections to the motor through operation of the reversing switch 106. Should the timer call for further operation of the motor, the sample chute will be driven in the opposite direction. Under normal timing sequence for sampling operations, the sample chute will make one traverse of the sample housing beneath the inlet conduit 12 and stop with the sampling operation to be initiated after a predetermined time delay. A small holding relay having a coil 148 and a normally open contact 150 is included in the circuit to insure that the motor will not reverse or overtravel except as dictated by the timer. Thus the coil 148 is connected across the input leads to the motor behind the reversing contacts thereof and its contact 150 is connected in parallel or holding circuit with the timer contact 142. Whenever the motor reverses through operation of the reversing switch, the relay 148 will be de-energized opening the holding circuit of the contact 150 on the timer such that the sampling sequence will not continue unless dictated by the timer motor.

In the operation of the improved sampling device, a control circuit therefor which may take varying forms utilizes timer 140 which is energized upon closure of the manual switch 135 or start switch to energize the same. The timer has its contacts 142 energized to a "closed" position for given periods and "open" for other predetermined periods to provide a desired timing sequence. With the closure of the timing contact 142 the contactor 120 is energized to close the power circuit to the motor 38. Depending upon the position of the reversing switch 106, the motor will drive in one direction or the other, the direction being determined by the position of the chute at the rest position. As the motor is energized, it drives the drive sprocket 44 urging the chain or propelling element 50 on the sprockets 44 and 46 to remove the bracket 28 mounting the sample chute 22 translationally and horizontally underneath the input conduit 14 to the casing 12 of the sampling device. The connection through the connecting bracket 65 to the mounting bracket 28 of the sampling chute drives the sample chute with the upper strand of the chain and in the direction determined by the drive sprocket 44. The mounting bracket 28 is guided on the supporting shaft 90 and the guide channel 80 through the bearing member 88 included on the mounting bracket 28. At the same time, the rotating disc which seals the sampling device is rotated by the lower strand of the chain through the drive which includes the slide block 70 and the channel member 72 mounted on the disc 55. The guide block 70 is slidably mounted in the guide channel 80 attached to the removable portion 27 of the casing to guide the lower strand of the chain in a horizontal or translational direction. The fixed outlet pipe 26 of the sample chute extends through slots 64 in the disc and 62 in the casing which slots are aligned to provide an aperture sufficient to surround the outlet pipe and basically seal the sampling device. The small slotted opening 24 in the top of the sampling chute effects a cutting operation of the sample material as it is moved translationally underneath the inlet conduit and the material being sampled will fall through the slot and into the sample chute 22 being directed down the inclined wall thereof to the outlet pipe. The outlet pipe is moved translationally back and forth across the exposed surface of the removable portion 27 of the sampling device and a suitable rubber tubular connection, such as is indicated at 152, permits the sampled material to be directed into a remotely positioned sample container completely isolated from the flow of granular material within the sampling device. Other means of connecting the outlet pipe to the remote sample container may be employed, if desired. Further the seal 75 around the slots 62, 64 of the disc and removable portion 27 of the casing minimizes the flow of any of the granular material out of the sampling device to possibly contaminate sample containers positioned removed from the sampling device. The solid connection from the sample chute provides a positive flow passage for the granular material to prevent any clogging thereof and insures accuracy and efficiency in the sampling operation. In addition, the sample chute is positioned adjacent and underneath sealing flaps 112 mounted at the extremes of travel of the sample chute such that the seal flaps cover the sample opening in the sample chute to prevent any blow-back of granular material into the sample chute when no sample is being taken. It will be noted that the removable portion or housing for the drive structure of the sample chute to which the sample chute is connected is basically positioned out of the direct flow passage of the granular material through the sampling casing 12. The inclined surface of the removable portion 27 insures that the drive sprocket chains and connections to the mounting bracket 28 and the rotating disc will be located out of direct flow contact with the sample material through the sampling chamber or casing 12. Further, the plate 92 positioned over the sprockets prevent contact or contamination with the granular material of the movable portions of the sampling device to minimize maintenance of the same. Similarly the location of the reversing switch and drive motor outside of the housing and the reversing structure and drive mounting for the support bracket 28 of the sample chute and rotating disc 55 are protected in a similar manner. The entire structure is mounted on the removable portion 27 of the casing which may be readily removed by removal of the screws 35 from the flange portions 32 of the removable portion of the casing such that the entire assembly may be removed therefrom for maintenance when needed. The overall structure of the improved sampling device is extremely compact in design in that the drive structure for the sample chute is positioned or located remote from the inlet conduit and the width dimension of the sampling casing is such as to hold down the overall size of the same and make it readily applicable to conveying systems with limited space for mounting of sampling devices. The improved structure may operate with a gravity flow type transmission system for the granular material or a pressurized system. The sample device is sealed and the sample is taken therefrom continuously and automatically without interruption of the sampling operation or opening of the equipment to facilitate accurate and continuous sampling. Further, the improved structure is relatively simplified in design, maintainence free and low in cost.

In considering this invention it should be remembered that the present disclosure is intended to be illustrative only and the scope of the invention should be determined by the appended claims.

What is claimed is:

1. A sampling device comprising, a casing having an inlet and an outlet conduit included therein, a sample chute positioned within said casing and having an open top extremity and a tapered bottom extremity terminating in an outlet pipe, bracket means mounting said sample chute and adapted to move the sample chute transversely within the casing back and forth beneath the inlet conduit of the casing, a continuous propelling element positioned within the casing and over a drive member, a positioning member connected to said bracket to move said bracket with said sample chute thereon, a circular disc journaled on said casing and positioned between the casing and the sample chute, guide means fixed on the edge of said disc, journal means slidably mounted in the guide means on the disc and connected to the propelling element to move the disc in an oscillating motion, the outlet pipe of the sample chute being positioned through an aperture in said disc and a mating slot in the casing such as to extend outside of said casing, and motor means connected to the drive member of the propelling element to move the drive member and the sample chute transversely beneath the inlet conduit of said casing and simultaneously move said disc such that the aperture in the disc through which said outlet pipe of the chute extends is positioned in alignment with the slot in the casing such that the casing is substantially sealed about the outlet pipe of the sample chute as it extends through the casing.

2. The sampling device of claim 1 and including limit switch means positioned on said casing and engaged by the bracket means at the extremes of travel of the chute member for reversing sequentially the direction of operation of the motor means.

3. The sampling device of claim 2 in which the inlet and outlet conduits in said casing are positioned in vertical relationship with respect to one another to provide for substantial gravitational flow of material through said casing and in which the sample chute has a solid outlet pipe and is of a length projecting into the casing equal to the width dimension of the inlet conduit such that the simple chute extends totally beneath the same.

4. The sampling device of claim 3 and including, a guide bracket mounted on said casing and positioned to slidably mount the bracket means of the sample chute such that the sample chute moves in a substantially horizontal direction.

5. The sampling device of claim 4 in which the continuous propelling element is a chain with the drive and positioning members being brackets mounting the chain which is physically connected to the bracket member to move the sample chute in a substantially horizontal position oscillating back and forth beneath the inlet conduit of the casing.

6. The sampling device of claim 5 in which the guide bracket includes the channel guiding and journaling the lower strand of the continuous chain connected to the circular disc with the guide means on the disc being channel like in form and with the journal means being a guide block of journal material slidably mounted in the channel form of the guide means.

7. The sampling device of claim 6 in which the guide blocks forming the journal means and the journal surface in the guide brackets are made of a material which requires no lubricant.

8. The sampling device of claim 7 in which the circular disc has a diametrical dimension which is greater than the corresponding width dimension of the inlet conduit plus twice the width of the sample chute.

9. The sampling device of claim 8 in which the guide means positioned on the circular disc is located diametrically opposite the aperture therein to which the outlet pipe of the sample chute extends with the aperture being elongated in a radial direction and in which the slot in the casing extends horizontal to the length of travel of the sample chute.

10. The sampling device of claim 9 in which a sample chute and circular disc together with the propelling element are mounted in the removable portion of the casing and including flange means attached to the removable portion of the casing and extending into the casing a distance equal to the extent of the sample chute and positioned at the limits of travel of the sample chute, and sealing means mounted on the flange means and positioned such that the sample chute at the extremes of travel are positioned under the flange means such that the sealing means cover the opening in the top of the sample chute.

11. A sampling device comprising, a casing having an inlet and an outlet conduit therein, a sample chute slidably mounted on a wall of the casing and including a tubular outlet pipe at the base thereof, means including motor means mounted on the wall of the casing and connected to the sample chute for moving the sample chute in a horizontal and oscillating direction back and forth beneath the inlet conduit to the casing, and sealing means having an aperture therein adapted to fit around the tubular outlet pipe of the same chute and connected to said means including motor means driving the sample chute for moving the aperture and the sealing means corresponding with the movement of the sample chute to seal the casing.

12. The sampling device in claim 11 in which the sample chute and the drive means therefor together with the sealing means are mounted on a removable wall of the casing so shaped that only the sampling chute extends into the path of travel of material between the inlet and outlet conduits of the casing.

13. The sampling device of claim 12 and including means attached to the removable wall of the casing and extending into the casing to be engaged by the sampling chute at the limits of travel thereof to seal the sample chute.

14. The sampling device of claim 13 in which the sealing means of the aperture therein is a rotatable plate member journaled on the removable wall of the casing and driven by the drive means for the sample chute with the aperture being a radially extending slot in the plate through which the outlet pipe of the sample chute extends and including a horizontal slot in the removable wall of the casing cooperating with the first named slot to provide for passage of the tubular pipe of the sample chute outside of the casing.

References Cited by the Examiner
UNITED STATES PATENTS

| | | | |
|---|---|---|---|
| 2,538,413 | 1/1951 | Chard | 222—364 X |
| 2,643,026 | 6/1953 | Craig et al. | 222—70 |
| 2,660,336 | 11/1953 | Coffey et al. | 222—70 |
| 2,780,984 | 2/1957 | Kleeman | 222—368 X |

ROBERT B. REEVES, *Primary Examiner.*

N. L. STACK, *Assistant Examiner.*